United States Patent
Hurst

(10) Patent No.: US 11,110,639 B2
(45) Date of Patent: Sep. 7, 2021

(54) METAL DETECTABLE POLYURETHANE FILM

(71) Applicant: Stephen Hurst, Summerside (CA)

(72) Inventor: Stephen Hurst, Summerside (CA)

( * ) Notice: Subject to any disclaimer, the term of this patent is extended or adjusted under 35 U.S.C. 154(b) by 0 days.

(21) Appl. No.: 15/473,755

(22) Filed: Mar. 30, 2017

(65) Prior Publication Data

US 2018/0281264 A1    Oct. 4, 2018

(51) Int. Cl.
*B29C 48/78* (2019.01)
*B29C 48/00* (2019.01)
*B29L 7/00* (2006.01)

(52) U.S. Cl.
CPC ............ *B29C 48/78* (2019.02); *B29C 48/022* (2019.02); *B29L 2007/008* (2013.01)

(58) Field of Classification Search
None
See application file for complete search history.

(56) References Cited

U.S. PATENT DOCUMENTS

| | | | | |
|---|---|---|---|---|
| 5,366,783 | A * | 11/1994 | Utsumi | G11B 5/73 428/141 |
| 6,090,872 | A * | 7/2000 | Albe | C08K 5/1535 524/111 |
| 2002/0114951 | A1* | 8/2002 | Horansky | B05D 1/265 428/412 |
| 2005/0211930 | A1* | 9/2005 | DeMeo | G01V 5/0008 250/516.1 |
| 2008/0081179 | A1* | 4/2008 | Li | D21F 3/0227 428/332 |
| 2010/0092710 | A1* | 4/2010 | Welker | C08G 18/0895 428/36.9 |
| 2012/0088882 | A1* | 4/2012 | Fan | C08L 23/0876 525/181 |

\* cited by examiner

*Primary Examiner* — Sheeba Ahmed

(57) ABSTRACT

A metal and X-Ray detectable polyurethane film having metallic particles blended into the polyurethane when in a liquid form and then having the film extruded so as to fully embed the metallic particles, such as iron oxide, across all areas of the film, which can be used in protective clothing, such as reusable aprons and sleeve covers, for example, in food processing applications. In this manner, the film permits easy detection, and thus removal of, damaged film portions that become detached from the protective garment and inadvertently introduced into the food being processed, before the final processing and packaging thereof.

5 Claims, 1 Drawing Sheet

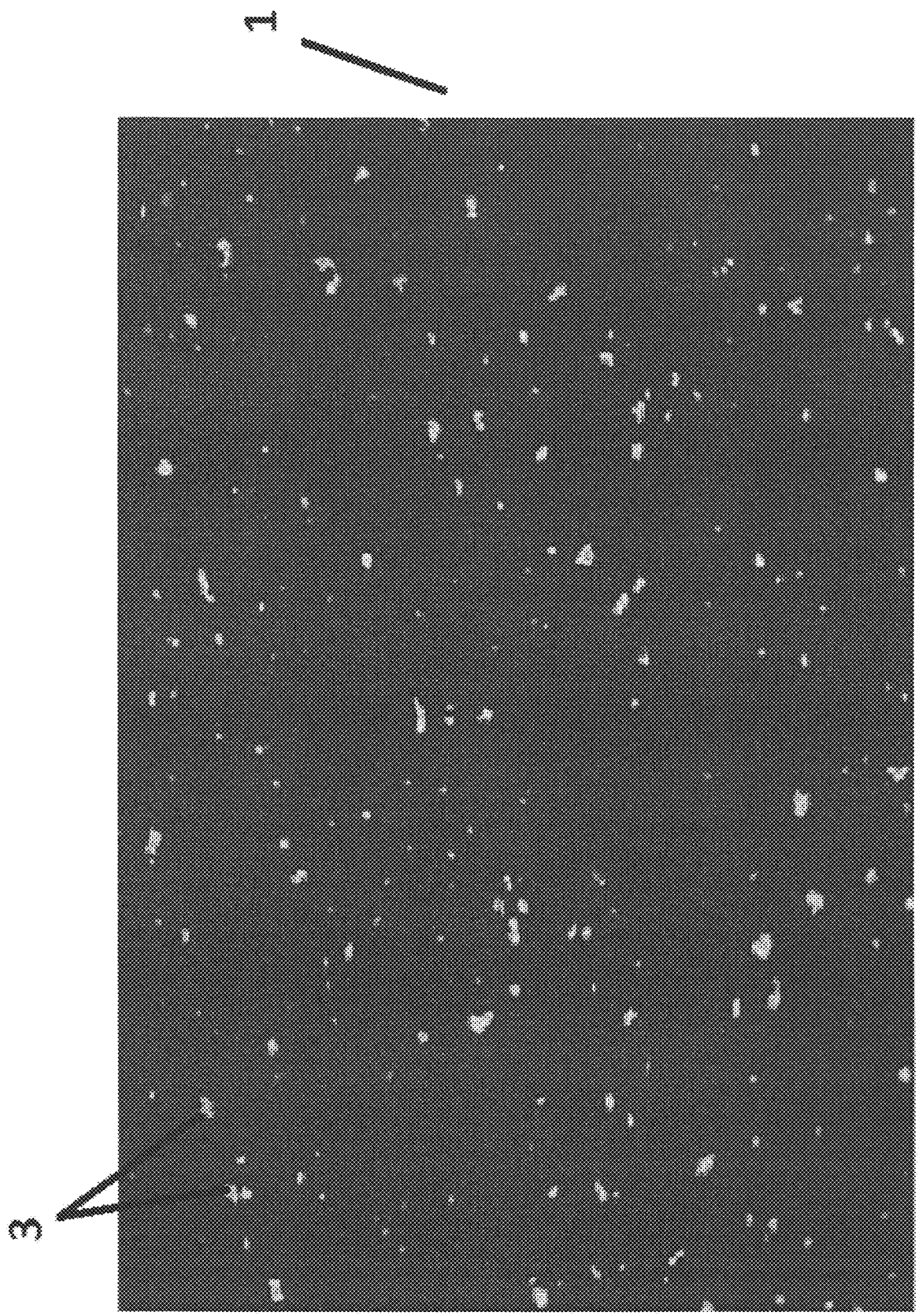

METAL DETECTABLE POLYURETHANE FILM

The present invention relates to a metal and X-Ray detectable polyurethane film for use in protective clothing, such as reusable aprons and sleeve covers for example, that are utilized in food processing facilities and food manufacturing sites and, more particularly, to an improved metal and X-Ray detectable polyurethane film having metallic particles, such as iron oxide, blended into the polyurethane when in a liquid form and then having the film blown so as to fully embed the metallic particles in all areas of the film.

BACKGROUND OF THE INVENTION

It is known that polyurethanes can be used to make protective clothing, such as disposable aprons and sleeve covers that can be utilized in food processing facilities and food manufacturing sites. For example, U.S. Pat. No. 3,539,424 (Tashlick) discloses a method of manufacturing polyurethane films and laminates comprising a polyurethane film and a substrate. However, polyurethane films can become damaged over time, and portions thereof may inadvertently be introduced into the food products being processed, and cannot easily be detected and removed.

It would therefore be advantageous to have an improved metal and X-Ray detectable polyurethane film that permits easy detection, and thus removal of, damaged film portions from such protective clothing that have become detached from the protective garment and inadvertently introduced into the food being processed. To this end, the present invention effectively addresses this need.

SUMMARY OF THE INVENTION

The present invention provides the advantage of an improved metal and X-Ray detectable polyurethane film for use in protective garments or clothing, such as reusable aprons and sleeve covers, in food processing facilities and food manufacturing sites.

The present invention also provides the advantage of an improved metal and X-Ray detectable polyurethane film that permits easy detection, and thus removal of, damaged film portions from such protective clothing that have become detached from the protective garments or clothing and inadvertently introduced into the food being processed, before final processing and packaging thereof.

According to a broad aspect of an embodiment of the present invention, there is disclosed a metal and X-Ray detectable polyurethane film comprising polyurethane heated to assume a form of a liquid film; a mixture having metallic particles therein blended into the liquid film, the mixture being extruded to embed the metallic particles across a length and width of the liquid film.

According to another broad aspect of an embodiment of the present invention, there is disclosed a method for manufacturing a metal and X-Ray detectable polyurethane film, the method comprising heating polyurethane to become a liquid film; blending a mixture having metallic particles therein into the liquid film; and extruding the mixture to embed the metallic particles across a length and width of the liquid film.

According to another aspect of the present invention, there is provided a method for manufacturing a method for manufacturing a metal and X-Ray detectable polyurethane film, the method comprising heating polyurethane to become a liquid film; blending a mixture having metallic particles therein into the liquid film; and extruding the mixture to embed the metallic particles across a length and width of the liquid film, the mixture having from about 2% to 7% by weight percentage iron oxide.

BRIEF DESCRIPTION OF THE DRAWINGS

The embodiments of the present invention will now be described by reference to the following FIGURE, and in which:

FIG. 1 is a side perspective view of the fence system of the present invention.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention relates to a metal and X-Ray detectable polyurethane film for use in protective garments or clothing, such as reusable aprons and sleeve covers, ideally in food processing facilities and food manufacturing sites, though it will be understood that variations as this use are possible. In an exemplary embodiment, solid forms of polyurethane are heated to assume the form of a liquid film, and then a mixture having metallic particles, such as (but not limited to) iron oxide, therein is blended into the liquid film. The mixture is then extruded, such as by conventional means which would be known to one skilled in the art, to embed the metallic particles in the mixture across a length and width of the liquid film.

In an exemplary embodiment, the mixture, in addition to the metallic particles (such as iron oxide) therein, can also further contain, but is not limited to, quantities of resins, pigments, barium lubricants, calcium, chromium, silicon, carbon, titanium and colorants (which may be present in a letdown ratio of about 15%, so this too can be varied). It will be understood that variations to this ratio are possible, and that quantities of each of these components in the mixture can be varied. In a further embodiment, the mixture comprises from about 4% to 6% by weight percentage of metallic particles, such as iron oxide, though variations to this are possible, such as the mixture having about 2% to 7% by weight percentage of metallic particles.

Referring to FIG. 1, there is shown the metal and X-Ray detectable polyurethane film of the present invention, shown generally at 1, with the traces of the metal and X-Ray detectable portions in the film, such as, for example, iron oxide, being shown as 3. In this manner, the metal and X-Ray detectable polyurethane film of the present invention permits easy detection, and thus safe removal of, damaged film portions that have become detached from protective garments or clothing used in food processing applications, and inadvertently introduced into the food being processed, before the final processing and packaging thereof.

In manufacturing the film of the present invention, a base polyether polyurethane resin is sent to a compounder, which re-pelletizes the resin, and encapsulating metallic particles, such as iron oxide powder, into these polyurethane pellets.

Once a detectable film is desired, along with an indication the approximate active percentage of detectable material desired in the final film to be processed, a calculation is done to determine how many pounds of metallic particles (such as iron oxide) must be blended in to, for example, each 100 lbs. of resin (along with other additives) to achieve a desired final percentage of detectable materials in the film to be processed.

The base polyether polyurethane resin (and the additives) is then blended with the metallic particles (such as iron oxide) at the desired ratio together in a large batch blender. This is then blended for a specified period and then vacuum loaded into a drying hopper above an extruder.

As the blend is being loaded into the drying hopper, and after the loading is complete, the batch is then dehumidified by desiccant dryers at elevated temperatures until the blend reaches a certain dew point, indicating that it is dry enough to then be fed into the extruder to make film. A gate at the bottom of the hopper is then opened and the batch is gravity fed into the extruder.

It will be apparent to those skilled in this art that various modifications and variations may be made to the embodiments disclosed herein. Other embodiments consistent with the present invention will become apparent from consideration of the specification and the practice of the invention disclosed therein.

Accordingly, the specification and the embodiments are to be considered exemplary only, with a true scope of the invention being disclosed by the following claims.

The embodiments of the invention in which an exclusive property or privilege is claimed are defined as follows:

1. A method for manufacturing a metal detectable polyurethane film, the method comprising:
    compounding polyurethane and metallic particles in a compounder to pelletize the resin and the metallic particles as polyurethane pellets;
    blending and heating a ratio of the polyurethane pellets and additives in a batch blender for a selected period to form a blended mixture liquid film, the additives in the blended mixture liquid film being selected from the group consisting of resins, barium lubricants, pigments, chromium, silicon, carbon, titanium, calcium, and colorants;
    vacuum loading the blended mixture liquid film into a drying hopper;
    dehumidifying the blended mixture liquid film in the drying hopper at an elevated temperature to reach a selected dew point; and
    extruding the blended mixture liquid film through an extruder.

2. The method for manufacturing a metal detectable polyurethane film of claim 1, further comprising the step of providing the blended mixture liquid film with from about 4% to 6% by weight percentage of the metallic particles.

3. The method for manufacturing a metal detectable polyurethane film of claim 1, further comprising the step of providing the blended mixture liquid film with from about 2% to 7% by weight percentage of the metallic particles.

4. The method for manufacturing a metal detectable polyurethane film of claim 1, wherein the metallic particles are iron oxide.

5. The method for manufacturing a metal detectable polyurethane film of claim 1, wherein the film is X-Ray detectable.

* * * * *